US010289176B1

(12) United States Patent
Chen et al.

(10) Patent No.: US 10,289,176 B1
(45) Date of Patent: May 14, 2019

(54) ELECTRONIC DEVICE WITH IMPROVED HEAT DISSIPATION CAPABILITY

(71) Applicant: Acer Incorporated, New Taipei (TW)

(72) Inventors: Hung-Chi Chen, New Taipei (TW);
Huei-Ting Chuang, New Taipei (TW);
Shun-Bin Chen, New Taipei (TW);
Kai-Yu Chuang, New Taipei (TW);
Yen-Chieh Chiu, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 16/058,991

(22) Filed: Aug. 8, 2018

(30) Foreign Application Priority Data

Jun. 1, 2018 (TW) .............................. 107207340 U

(51) Int. Cl.
*G06F 1/16* (2006.01)
*G06F 1/20* (2006.01)

(52) U.S. Cl.
CPC .............. *G06F 1/203* (2013.01); *G06F 1/206* (2013.01); *G06F 1/1681* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,534,891 A * | 7/1996 | Takano | ................. | G06F 1/1616 345/169 |
| 5,754,395 A * | 5/1998 | Hsu | ....................... | G06F 1/1616 361/679.11 |
| 6,008,986 A * | 12/1999 | Mok | ..................... | G06F 1/1616 361/679.12 |
| 6,028,768 A * | 2/2000 | Cipolla | ................. | G06F 1/1616 361/679.12 |
| 6,078,495 A * | 6/2000 | Cipolla | ................... | G06F 1/203 361/679.46 |
| 6,175,492 B1 * | 1/2001 | Nobuchi | ............... | G06F 1/1616 361/679.08 |
| 6,437,978 B1 * | 8/2002 | Ozaki | ..................... | G06F 1/203 165/104.33 |
| 6,496,369 B2 * | 12/2002 | Nakamura | ............ | G06F 1/1616 165/80.3 |
| 6,599,090 B2 * | 7/2003 | Ozaki | ..................... | G06F 1/203 361/679.21 |

(Continued)

FOREIGN PATENT DOCUMENTS

| | | |
|---|---|---|
| TW | I318552 | 12/2009 |
| TW | I489927 | 6/2015 |
| TW | I539886 | 6/2016 |

*Primary Examiner* — Lisa Lea-Edmonds
(74) *Attorney, Agent, or Firm* — JCIPRNET

(57) ABSTRACT

An electronic device includes a first body, a second body, a shaft, a cam, a cover plate, a fulcrum and a lever element. The first body has a convection groove. The shaft is connected to the second body. The fulcrum is connected to the shaft and disposed in the first body. The second body is pivoted to the first body through the shaft and the cam. The cover plate is movably disposed on the first body and configured to operably hide the convection groove. The fulcrum is disposed in the first body. The lever element is disposed in the first body and pivots about the fulcrum. The lever element includes a first end and a second end, respectively located at two opposite sides of the fulcrum. The cam abuts against the first end, and the second end is movably coupled to the cover plate.

10 Claims, 5 Drawing Sheets

(56) References Cited

U.S. PATENT DOCUMENTS

| | | | | |
|---|---|---|---|---|
| 7,012,806 B2* | 3/2006 | Jones | ................ | G06F 1/1616 |
| | | | | 165/104.11 |
| 7,630,195 B2* | 12/2009 | Lin | .................. | G06F 1/203 |
| | | | | 361/679.26 |
| 7,894,184 B2* | 2/2011 | Huang | ............... | G06F 1/1616 |
| | | | | 361/679.11 |
| 8,000,097 B2* | 8/2011 | Yamamoto | ......... | G11B 17/0288 |
| | | | | 340/572.1 |
| 8,520,382 B2* | 8/2013 | Tye | .................. | G06F 1/203 |
| | | | | 248/685 |
| 8,542,486 B2* | 9/2013 | Lin | .................. | G06F 1/203 |
| | | | | 174/547 |
| 9,104,374 B2* | 8/2015 | Tsai | ................. | G06F 1/1616 |
| 9,740,253 B2* | 8/2017 | Cheng | ............... | G06F 1/203 |
| 10,149,405 B2* | 12/2018 | Chou | ................ | G06F 1/203 |

* cited by examiner

ELECTRONIC DEVICE WITH IMPROVED HEAT DISSIPATION CAPABILITY

CROSS-REFERENCE TO RELATED APPLICATION

This application claims the priority benefit of Taiwan application serial no. 107207340, filed on Jun. 1, 2018. The entirety of the above-mentioned patent application is hereby incorporated by reference herein and made a part of this specification.

BACKGROUND OF THE INVENTION

1. Field of the Invention

The disclosure relates to an electronic device, and more particularly to an electronic device with improved heat dissipation capability.

2. Description of Related Art

The computing performance and the portability of laptop computers have made them indispensable for people nowadays. As the computing performance of the laptop computers keeps increasing, the heat generated by electronic components (such as a central processing unit, a graphic chip, or a display chip) operating inside the laptop computers also increases continuously. Because the overheating of the laptop computers might result in the malfunction, cooling fans are commonly utilized to draw cooler air from and expel warmer air to the outside of the computers. Therefore, a plurality of apertures are often disposed on a chassis of the laptop computer for passing through the airflow induced by the cooling fan.

It is, however, not feasible to improve the heat dissipation by disposing many apertures on the computer chassis. Foreign objects and moisture may easily enter the computer chassis via the apertures and damages the components of the computers. On the other hand, the heat dissipation capability may seriously degrade without enough apertures.

SUMMARY OF THE INVENTION

The disclosure provides an electronic device with improved heat dissipation capability.

The electronic device according to the disclosure includes a first body, a second body, a shaft, a cam, a cover plate, a fulcrum, and a lever element. The first body includes a convection groove. The shaft is connected to the second body. The cam is connected to the shaft and is disposed in the first body, wherein the second body is pivoted to the first body through the shaft and the cam. The cover plate is movably disposed on the first body and is configured to operably hide the convection groove. The fulcrum is disposed in the first body. The lever element is supported by the fulcrum and is swingably disposed in the first body and includes a first end and a second end, and the first end and the second end are respectively located at two opposite sides of the fulcrum. The cam abuts against the first end, and the second end is movably coupled to the cover plate. When the second body pivots on the first body, the cam rotating along with the second body drives the first end of the lever element to swing around the fulcrum, and the cover plate is driven by the second end of the lever element to move relative to the first body.

In view of the above, when the second body pivots on the first body, the cam rotating along with the second body may drive the lever element to swing, and the cover plate is driven by the lever element to move relative to the first body. Further, when the second body is unfolded relative to the first body, the cover plate moves away from the first body to expose the convection groove of the first body to enhance the circulation capability of airflow inside and outside the first body and quickly expel the heat generated by the electronic device. The heat dissipation capability of the electronic device may therefore be improved.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
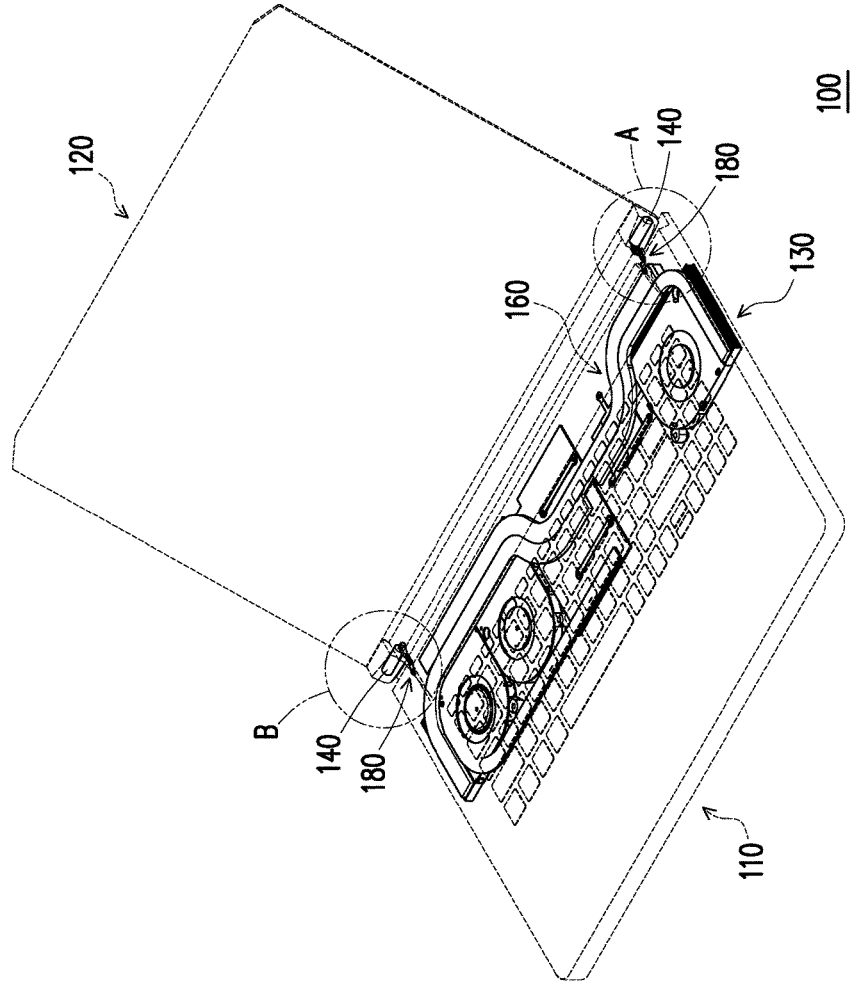
FIG. 1 is a schematic view of an electronic device according to an embodiment of the disclosure.

Reference will now be made in detail to the present preferred embodiments of the invention, examples of which are illustrated in the accompanying drawings. Wherever possible, the same reference numbers are used in the drawings and the description to refer to the same or like parts.

Figure 2:
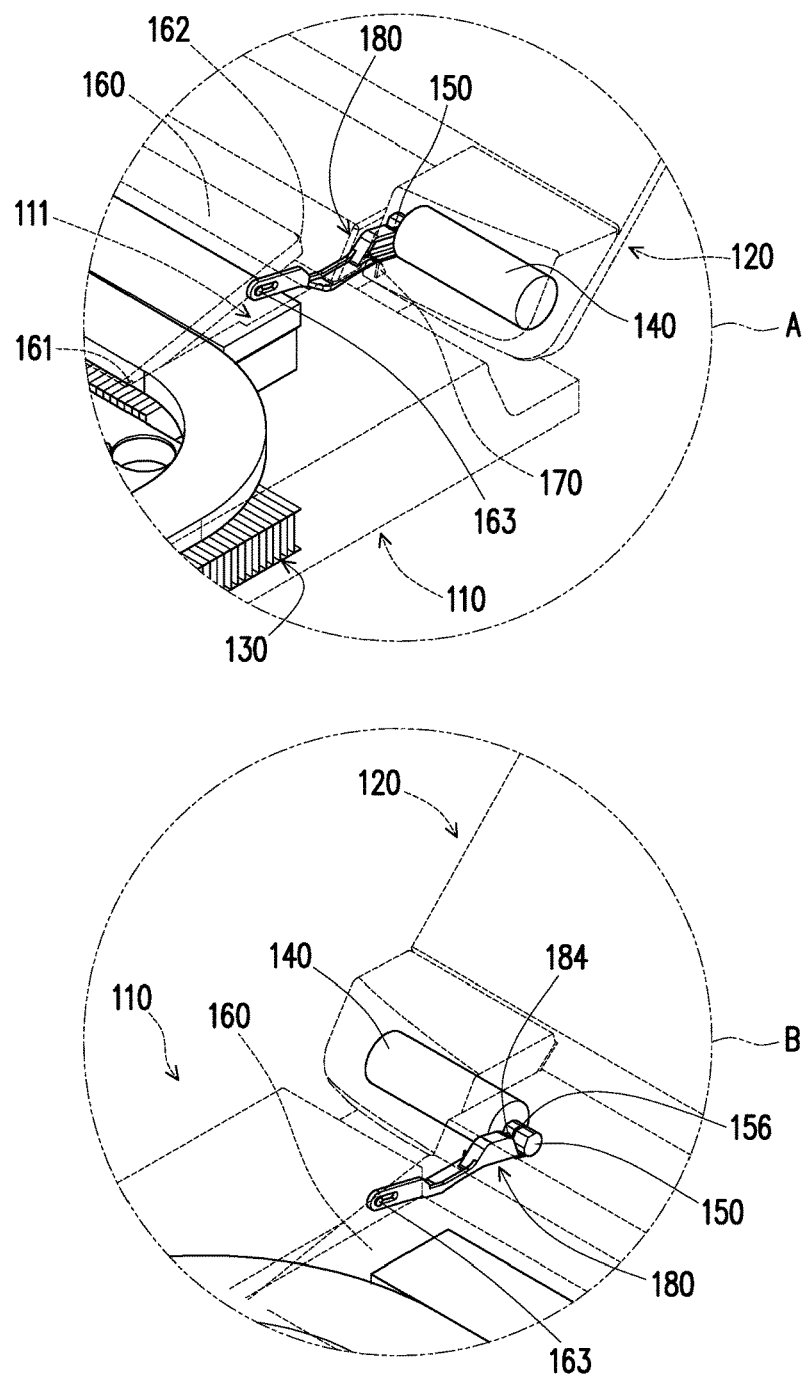
FIG. 2 is an enlarged view of regions A and B of the electronic device of FIG.

FIG. 1 is a schematic view of an electronic device according to an embodiment of the disclosure. FIG. 2 is an enlarged view of regions A and B of the electronic device of FIG. 1. It should be particularly stated that a first body 110, a second body 120 and a cover plate 160 of FIGS. 1 and 2 are drawn in broken lines to clearly demonstrate the relative relationship between respective components. Further, the electronic device 100 of FIG. 1 is in an unfolded state. In the unfolded state, an angle exists between the first body 110 and the second body 120. While in the folded state, a surface of the first body 110 substantially abuts against a surface of the second body 120.

Referring to FIGS. 1 and 2, in the embodiment, an electronic device 100 may be a laptop computer including the first body 110 and the second body 120 that are pivoted to each other. The first body 110 may be a host computer, and electronic components (not shown, such as a central processing unit, a graphics chip, or a display chip) are disposed inside the first body 110. Moreover, the electronic components in operation generate heat. Therefore, a thermal module 130 is provided in the first body 110. The thermal module 130 may comprise a cooling fan, a heat pipe, a cooling plate, and so on, and the cooling fan is configured to cause forced convection to quickly expel the heat generated by the electronic device. Correspondingly, a convection groove 111 for airflow to go through is disposed in the first body 110 to boost the circulation capability of airflow to enhance the heat dissipation capability.

The electronic device 100 further includes a shaft 140, a cam 150, a cover plate 160, a fulcrum 170, and a lever element 180. The cam 150 is connected to the shaft 140, and the cam 150 and the shaft 140 may be integrated as a single component. Specifically, the shaft 140 is connected to the second body 120, at least a portion of the shaft 140 and the cam 150 are disposed in the first body 110. In other words, the cam 150 is disposed in the first body 110, and the second body 120 is pivoted to the first body 110 through the shaft 140. Therefore, when the second body 120 pivots on the first body 110 through the shaft 140, the cam 150 connected to the shaft 140 also rotates along with the second body 120. Persons of ordinary skill in the art should understand that a profile of the cam 150 is not a cylinder of revolution and may be adjusted according to different design considerations to perform the required mechanism.

Figure 3:
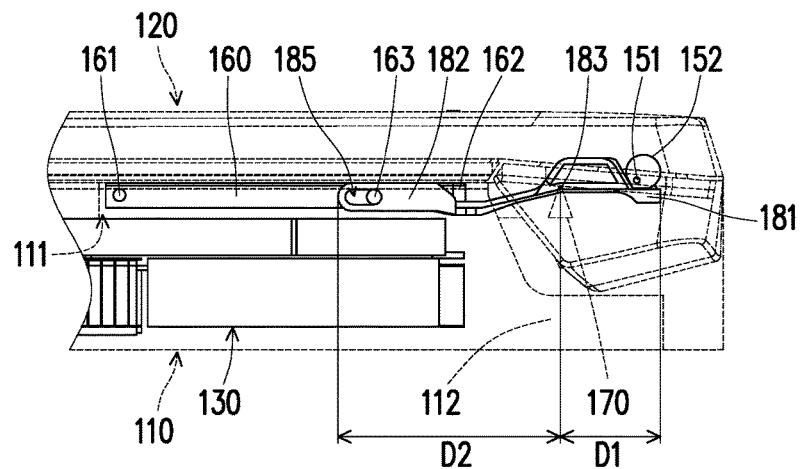
FIG. 3 is a partial enlarged view of an electronic device according to an embodiment of the disclosure that is in a folded state.
Figure 4:
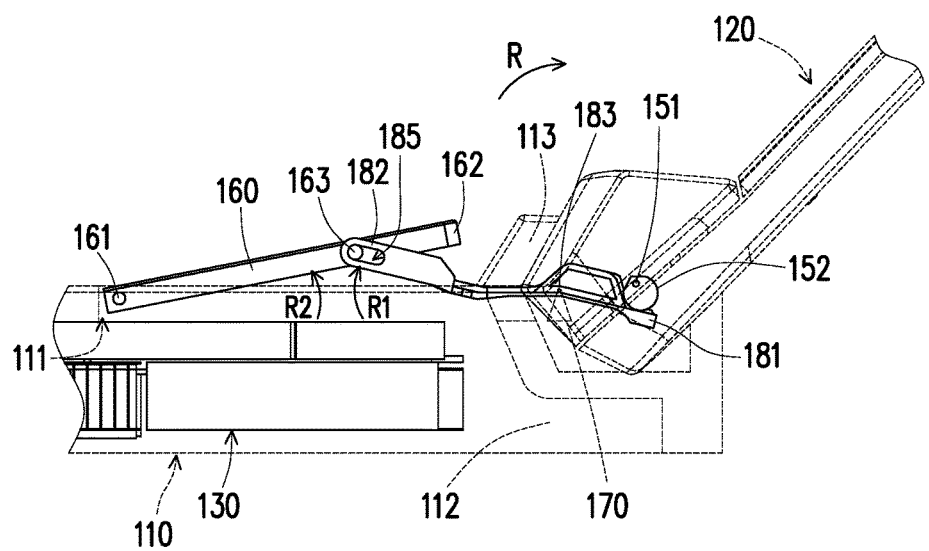
FIG. 4 is a partial enlarged view of an electronic device according to an embodiment of the disclosure that is in an unfolded state.

FIG. 3 is a partial enlarged view of an electronic device according to an embodiment of the disclosure that is in a folded state. FIG. 4 is a partial enlarged view of an electronic device according to an embodiment of the disclosure that is in an unfolded state. To clearly demonstrate the movement relationship between the cam 150 and the lever element 180, the shaft 140 is omitted from FIGS. 3 and 4. Referring to FIGS. 1 to 4, in the embodiment, the cover plate 160 is movably disposed on the first body 110 and is configured to operably or selectively hide a convection groove 111. Depending on the relative positions between the first body 110 and the second body 120, the convection groove 111 may be completely hidden by the cover plate 160 or partially exposed.

The electronic device 100, when in the folded state shown in FIG. 3, is usually in an off state or a low-power state, and the convection groove 111 may be completely hidden by the cover plate 160. Foreign materials or moisture cannot easily enter the first body 110 through the convection groove 111, and an entire appearance of the electronic device 100 may also be maintained. Conversely, the electronic device 100, when in the unfolded state shown in FIG. 4, is usually in an on state and requires a better heat dissipation capability. Since the convection groove 111 is exposed, the interconnectivity between the inside and the outside of the first body 110 is enhanced, and so does the airflow exchanging capability between the inside and the outside of the first body 110. The thermal module 130 may quickly expel the heat generated by the electronic device 100, the heat dissipation capability of the electronic device 100 is enhanced.

On the other hand, the convection groove 111 may provide a room for receiving the cover plate 160. When the electronic device 100 is in the folded state shown in FIG. 3, the cover plate 160 moves into the convection groove 111 to prevent the situation that the cover plate 160 protrudes from the first body 110 to create an excessively large gap between the first body 110 and the second body 120 when abutting each other. Further, an inner profile of the convection groove 111 matches an outer profile of the cover plate 160. In this manner, after the cover plate 160 moves into the convection groove 111, the cover plate 160 may block the passage between the outside and the inner space of the first body 110.

The mechanism of the cover plate 160 are described below. Referring to FIGS. 1-4, in the embodiment, the fulcrum 170 is disposed in the first body 110. The lever element 180 is supported by the fulcrum 170 and swingably disposed in the first body 110. Further, the lever element 180 includes a first end 181, a second end 182 and a supporting portion 183 located between the first end 181 and the second end 182. The first end 181 and the second end 182 are respectively located at two opposite sides of the fulcrum 170. The supporting portion 183 is pivoted to the fulcrum 170, so the first end 181 and the second end 182 may swing back and forth around the supporting portion 183 and the fulcrum 170. On the other hand, the cam 150 abuts against the first end 181, and the second end 182 is movably coupled to the cover plate 160. When the second body 120 pivots on the first body 110, the cam 150 rotating along with the second body 120 drives the first end 181 to enable the lever element 180 to swing around the fulcrum 170, and the cover plate 160 is driven by the second end 182 of the lever element 180 to move relative to the first body 110.

On the other hand, the cover plate 160 includes a pivot end 161, a motion end 162 opposite to the pivot end 161, and a coupling portion 163 located between the pivot end 161 and the motion end 162. The pivot end 161 is pivoted to the first body 110, and the pivot end 161 and the fulcrum 170 are respectively located at two opposite sides of the motion end 162. In this configuration, the cover plate 160 driven by the lever element 180 would experience a greater moving stroke. Further, the second end 182 of the lever element 180 has a chute 185, and the coupling portion 163 is slidably disposed in the chute 185. When the cover plate 160 is driven by the second end 182 to pivot on the first body 110, the coupling portion 163 may slide back and forth between the two opposite dead points of the chute 185. In another embodiment, the chute may also be disposed in the cover plate 160 with a corresponding coupling portion disposed in the lever element 180. This manner also achieves technical effects similar to the above embodiment.

When the electronic device 100 is changed from the folded state shown in FIG. 3 to the unfolded state shown in FIG. 4, the cam 150 pivots on the first body 110 along a rotating direction R, and presses down the first end 181 with different locations in the outer profile of the cam 150. Based on the principle of leverage, the second end 182 is lifted subsequently and drives the cover plate 160 to move upward. At this time, the lever element 180 swings around the fulcrum 170 along a rotating direction R1 the same as the rotating direction R, and the coupling portion 163 is guided by and slides in the chute 185 of the second end 182 in a direction moving away from the fulcrum 170. Thus, the cover plate 160 may move away from to the first body 110. By utilizing the pivoting end 161 as a rotating axis, the motion end 162 of the cover plate 160 rotates along a rotating direction R2 opposite to the rotating direction R to rotate away from the first body 110 to expose the convection groove 111.

In the embodiment, the first body 110 includes a base 112 and a casing 113 disposed on the base 112. The cam 150, the first end 181 of the lever element 180 and the fulcrum 170 are disposed between the casing 113 and the base 112. On the other hand, the cover plate 160 and the casing 113 are arranged side by side, and at least a portion of the lever element 180 between the casing 113 and the base 112 extends outward to be coupled to the cover plate 160 through the second end 182 disposed outside the casing 113. As the lever element 180 swings around the fulcrum 170 along the rotating direction R1, the lever element 180 is stopped when a section of the lever element 180 protruding from the casing 113 structurally engages the casing 113. In other words, the casing 113 limits the stroke of the lever element 180 swinging around the fulcrum 170 along the rotating direction R1.

By contrast, when the electronic device 100 is changed from the unfolded state shown in FIG. 4 to the folded state shown in FIG. 3, the cam 150 pivots on the first body 110 along a direction opposite to the rotating direction R, and the first end 181 is lifted with different locations in the outer profile of the cam 150. Based on the principle of leverage, the second end 182 moves down subsequently and drives the cover plate 160 to move downward. At this time, the lever element 180 swings around the fulcrum 170 along a direction opposite to the rotating direction R1, and the coupling portion 163 is guided by and slides in the chute 185 of the second end 182 in a direction moving toward the fulcrum 170. Thus, the cover plate 160 may move toward the first body 110. By utilizing the pivot end 161 as a rotating axis, the motion end 162 of the cover plate 160 rotates along a direction opposite to the rotating direction R2 toward to the first body 110 so as to hide the convection groove 111.

In the embodiment, a first distance D1 between the fulcrum 170 and the first end 181 is smaller than a second distance D2 between the fulcrum 170 and the second end 182. Based on the principle of leverage, when a user applies force to the second body 120 to allow the second body 120 to pivot on the first body 110, it requires a larger force being applied to the second body 120 to enable the cam 150 to drive the lever element 180 to swing around the fulcrum 170. In this way, the user may not only obtain firm handling of operation, but the second body 120 may also be prevented from being unfolded easily relative to the first body 110. On the other hand, a coupling point of the second end 182 on the cover plate 160 is relatively farther away from the pivot end 161. Thus, with a greater lever arm, a process of unfolding the cover plate 160 (i.e. allowing the cover plate 160 to rotate along the rotating direction R2 to rotate away from the first body 110 to expose the convection groove 111) may be smoother. Further, since the second distance D2 between the fulcrum 170 and the second end 182 is greater than the first distance D1 between the fulcrum 170 and the first end 181, the cover plate 160 driven by the second end 182 may experience a greater lifting stroke. In another embodiment, the values of the first distance D1 and the second distance D2 may also be adjusted according to different design considerations.

In the embodiment, a group of the shaft 140, the cam 150, the lever element 180 and the fulcrum 170 is disposed on a first side of the cover plate, another group of the shaft, the cam, the lever element, and the fulcrum is disposed on a second side of the cover plate which is opposite to the first side of the cover plate 160. The configuration enhances the stability of the second body 120 pivoting on the first body 110 while enhancing the stability and reliability of the cover plate 160 pivoting on the first body 110. In other embodiments, a number of the groups containing the cam, the lever element and the fulcrum may be one, and the group is disposed on a single side of the cover plate.

Figure 5:
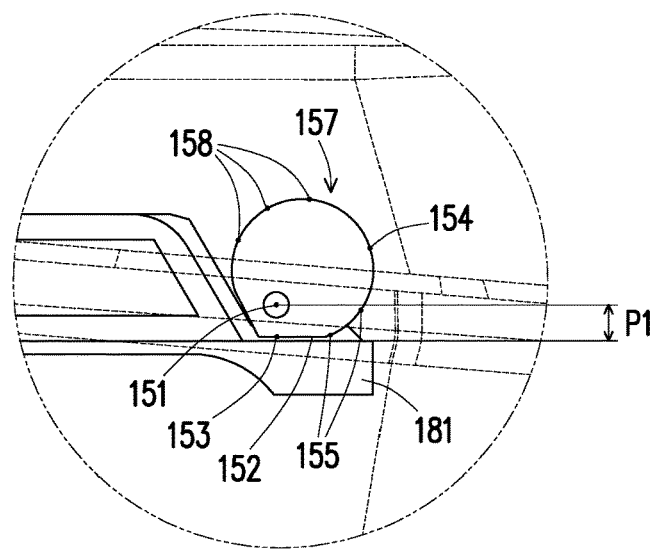
FIG. 5 is a partial enlarged view of the first end of the lever element and the cam of FIG. 3.
Figure 6:
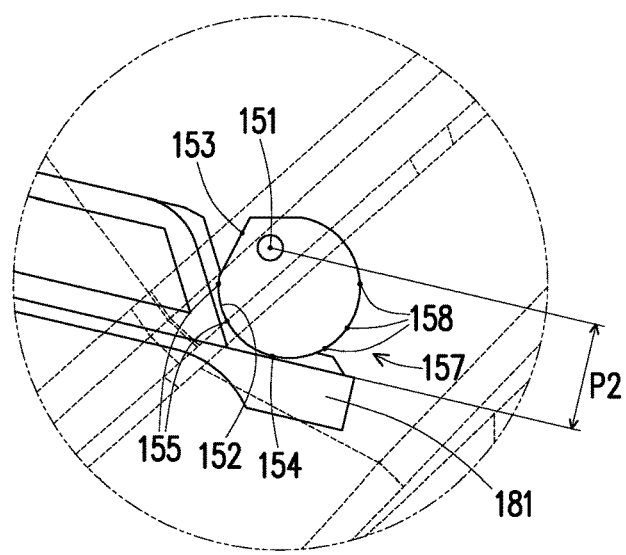
FIG. 6 is a partial enlarged view of the first end of the lever element and the cam of FIG. 4.

The operations of the cam 150 are described below. FIG. 5 is a partial enlarged view of the first end of the lever element 180 and the cam 150 of FIG. 3. FIG. 6 is a partial enlarged view of the first end of the lever element 180 and the cam 150 of FIG. 4. Referring to FIGS. 3-6, in the embodiment, the cam 150 has a rotating axis 151 and an abutting surface 152 surrounding the rotating axis 151. When the electronic device 100 is in the folded state shown in FIG. 3, the abutting surface 152 of the cam 150 abuts against the first end 181 of the lever element 180 through a first abutting point 153, and a distance P1 is provided between the rotating axis 151 and the first abutting point 153.

During the electronic device 100 switching from the folded state shown in FIG. 3 to the unfolded state shown in FIG. 4, the cam 150 pivots on the first body 110 along the rotating direction R, and the abutting surface 152 abuts against the first end 181 of the lever element 180 through other abutting points 155 (which are different from the first abutting point 153) sequentially until the abutting surface 152 abuts against the first end 181 of the lever element 180 through a second abutting point 154. That is to say, the other abutting points 155 are located between the first abutting point 153 and the second abutting point 154. Further, a distance P2 is provided between the rotating axis 151 and the second abutting point 154. The distance P2 is greater than the distance P1, and a plurality of third distances between the other abutting points 155 and the rotating axis 151 increase gradually from the first abutting point 153 toward the second abutting point 154. Accordingly, the cam 150 rotating along the rotating direction R may continuously press down the first end 181 of the lever element 180 to allow the lever element 180 to swing around the fulcrum 170 along the rotating direction R1 the same as the rotating direction R and to drive the cover plate 160 to rotate along the rotating direction R2 opposite to the rotating direction R to rotate away from the first body 110 to expose the convection groove 111.

In some embodiments, when the abutting surface 152 of the cam 150 abuts against the first end 181 of the lever element 180 through the second abutting point 154, since a section of the lever element 180 protruding from the casing 113 structurally engages the casing 113, the lever element 180 does not continue swinging even though the cam 150 continuously rotates along the rotating direction R. In addition, a sliding stroke of the coupling portion 163 of the cover plate 160 in the chute 185 of the second end 182 of the lever element 180 may also limit a swinging stroke of the lever element 180 or the rotating stroke of the cover plate 160.

In other embodiments, in another section of the abutting surface 152 that is different from the section between the first abutting point 153 and the second abutting point 154 and follows the second abutting point 154, the abutting surface 152 has an arc section 157. If the cam 150 continuously rotates along the rotating direction R, the abutting surface 152 abuts against the first end 181 of the lever element 180 through the arc section 157. Moreover, a plurality of fourth distances between the abutting points 158 on the arc section 157 and the rotating axis 151 are equal and equal to the distance P1. Accordingly, even though the cam 150 abuts against the first end 181 of the lever element 180 through the second abutting point 154 before rotating along the rotating direction R continuously, and then abuts against the first end 181 of the lever element 180 through the arc section 157, the cam 150 would not further press down the first end 181 of the lever element 180.

By contrast, during the electronic device 100 switching from the unfolded state shown in FIG. 4 to the folded state shown in FIG. 3, the third distances between the abutting points 155 on the abutting surface 152 of the cam 150 and the rotating axis 151 decrease gradually from the second abutting point 154 toward the first abutting point 153. At this time, the first end 181 of the lever element 180 is lifted with different locations in the outer profile of the cam 150. Based on the principle of leverage, the second end 182 moves down subsequently and drives the cover plate 160 to move downward. Further, the lever element 180 swings around the fulcrum 170 along a direction opposite to the rotating direction R1 to drive the cover plate 160 to rotate along a direction opposite to the rotating direction R2 to get close to the first body 110 to hide the convection groove 111.

In other words, when the user uses the electronic device 100, the cover plate 160 would remain unfolded to expose the convection groove 111, so there is sufficient amount of air entering or exiting for the thermal module 130 to enhance the heat dissipation capability.

Referring to region B of FIG. 2, the cam 150 and the lever element 180 are equipped with guide structures which match each other. In the embodiment, the cam 150 has a guide groove 156, and a guide rail 184 is disposed on a side of the lever element 180 that is in contact with the cam 150. The guide rail 184 is coupled to the guide groove 156. The coordination between the guide rail 184 and the guide groove 156 not only prevents the cam 150 from being separated from the lever element 180, but also enhances the rotating stability of the cam 150 and the swinging stability of the lever element 180. In other embodiments, the guide may be disposed in the cam, and the guide groove may be disposed on a side of the lever element in contact with the cam.

Figure 7:
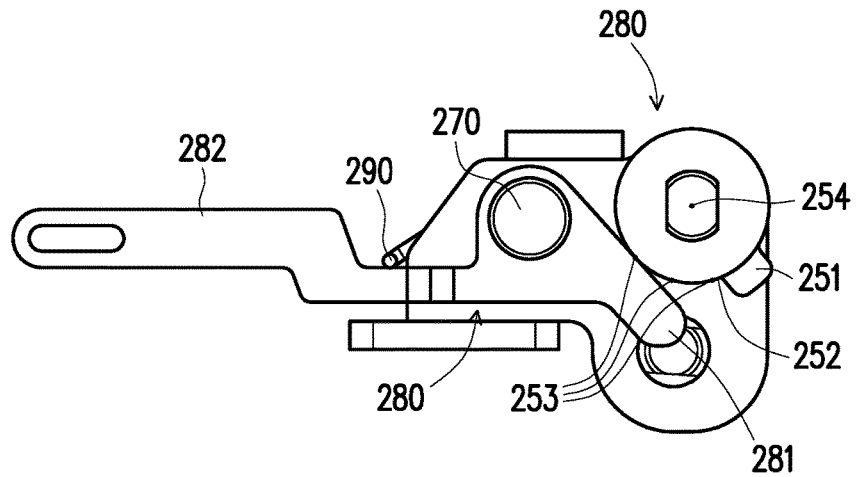
FIGS. 7 and 8 are respectively partial enlarged views of a cam and a lever element that are in different states according to another embodiment of the disclosure.
Figure 8:
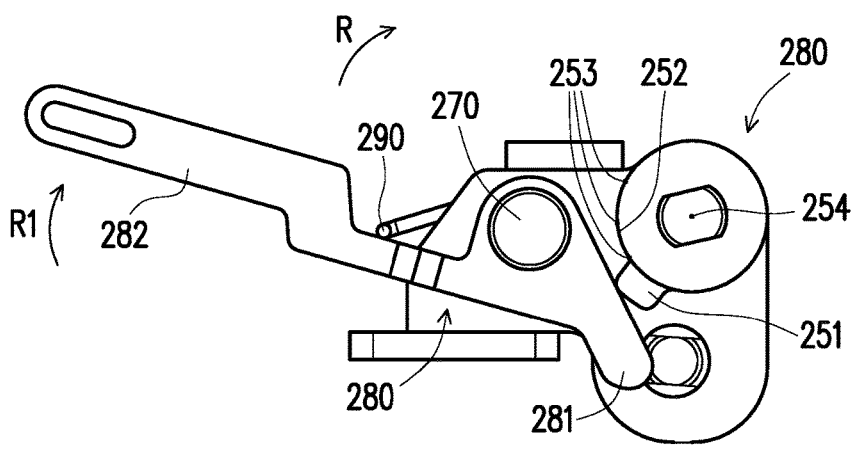

FIGS. 7 and 8 are respectively partial enlarged views of the cam and the lever element in two different states according to another embodiment of the disclosure. It should be specifically stated that the driving structures of FIGS. 7 and 8 are also respectively applicable to the electronic device 100 according to the above embodiment to reveal or hide the cover plate 160. The state shown in FIG. 7 corresponds to a folded state, while the state shown in FIG. 8 corresponds to an unfolded state. Descriptions about the differences in driving structure between the embodiment and the above embodiment are presented below with descriptions about similarities omitted.

Referring to FIGS. 7 and 8, in the embodiment, a cam 250 has an abutting surface 252 and a rotating axis 254 surrounded by the abutting surface 252. A plurality of fifth distances between the abutting points 253 on the abutting surface 252 of the cam 250 and the rotating axis 254 are equal. Further, the cam 250 further includes a protrusion portion 251 protruding from the abutting surface 252. A sixth distance between the protrusion portion 251 and the rotating axis 254 is greater than the fifth distances between the abutting points 253 and the rotating axis 254.

During the transition from the folded state shown in FIG. 7 to the unfolded state shown in FIG. 8, the cam 250 rotates along the rotating direction R. Before the protrusion portion 251 abuts against a first end 281 of a lever element 280, since the fifth distances between the abutting points 253 on the abutting surface 252 and the rotating axis 254 are equal, the cam 250 does not press down the first end 281 of the lever element 280. The protrusion portion 251 does not press down the first end 281 until the protrusion portion 251 abuts against the first end 281 of the lever element 280. Based on the principle of leverage, a second end 282 of the lever element 280 is lifted subsequently and drives a cover plate (not shown) upward. At this time, the lever element 280 swings around a fulcrum 270 along the rotating direction R1.

By contrast, during transition from the unfolded state shown in FIG. 8 to the folded state shown in FIG. 7, when the cam 250 rotates along a direction opposite to the rotating direction R, the protrusion portion 251 would be gradually away from the first end 281 of the lever element 280. At this time, the cam 250 abuts against the first end 281 of the lever element 280 through the abutting surface 252. Since changes in the geometric profile of the cam 250 causes the first end 281 to be lifted, based on the principle of leverage, the second end 282 of the lever element 280 is down subsequently and drive the cover plate (not shown) downward. At this time, the lever element 280 swings around the fulcrum 270 along a direction opposite to the rotating direction R1.

In the embodiment, one of the ends of an elastic member 290 abuts against a portion between the first end 281 and the second end 282 of the lever element 280 and abuts against a portion between the second end 282 and the fulcrum 270. During the transition from the folded state shown in FIG. 7 to the unfolded state shown in FIG. 8, the lever element 280 swings around the fulcrum 270 along the rotating direction R1 the same as the rotating direction R, and since the lever element 280 compresses the elastic member 290, the elastic member 290 undergoes elastic deformation. With the elastic member 290, the user obtains rather firm handling of operation when activating the electronic device (not shown). During the transition from the unfolded state shown in FIG. 8 to the folded state shown in FIG. 7, the elastic member 290 restoring its elastic force may drive the lever element 280 to swing around the fulcrum 270 along a direction opposite to the rotating direction R1 to ensure the lever element 280 restores to the folded state shown in FIG. 7. In the embodiment, a torsion spring may serve as the elastic member 290. In other embodiments, a compression spring may serve as an elastic member.

In view of the foregoing, when the second body pivots on the first body, the cam rotating along with the second body may drive the lever element to swing, and by placing the axis of the cam and the lever element at multiple distances, the cover plate is driven by the lever element to move relative to the first body. When the second body is unfolded relative to the first body, the cover plate moves away from the first body to expose the convection groove of the first body. Enhancing the circulation capability of the airflow inside and outside the first body and quickly expelling the heat generated by the electronic device to enhance the heat dissipation capability of the electronic device. On the other hand, when the second body is folded to the first body, the cover plate moves close to the first body and hides the convection groove of the first body. Therefore, when the electronic device is in the folded state, foreign materials or moisture from the outside cannot easily enter the first body, and the entire appearance of the electronic device may also be maintained.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic device, comprising:
   a first body, comprising a convection groove;
   a second body;
   a shaft, connected to the second body;
   a cam, connected to the shaft and disposed in the first body, wherein the second body is pivoted to the first body through the shaft and the cam;
   a cover plate, movably disposed on the first body and configured to operably hide the convection groove;
   a fulcrum, disposed in the first body; and a lever element, supported by the fulcrum and swingably disposed in the first body, wherein the lever element comprises a first end and a second end, the first end and the second end are respectively located at two opposite sides of the fulcrum, the cam abuts against the first end, and the second end is movably coupled to the cover plate;

wherein when the second body pivots on the first body, the cam rotating along with the second body drives the first end of the lever element to swing around the fulcrum, and the cover plate is driven by the second end of the lever element to move relative to the first body.

2. The electronic device according to claim 1, wherein the cover plate comprises a pivot end, a motion end opposite to the pivot end and a coupling portion located between the pivot end and the motion end; the pivot end is pivoted to the first body; the second end comprises a chute; the coupling portion is slidably disposed in the chute; the pivot end and the fulcrum are respectively located at two opposite sides of the motion end; when the cam rotating along with the second body drives the first end of the lever element to swing around the fulcrum and the cover plate is driven by the second end to move relative to the first body, the pivot end serves as a rotating axis and the motion end rotates around the pivot end to rotate away from the first body so as to expose the convection groove or to rotate toward to the first body so as to hide the convection groove.

3. The electronic device according to claim 1, wherein the cover plate comprises a pivot end, a motion end opposite to the pivot end and a chute located between the pivot end and the motion end; the pivot end is pivoted to the first body; the second end comprises a coupling portion; the coupling portion is slidably disposed in the chute; and the pivot end and the fulcrum are respectively located at two opposite sides of the motion end.

4. The electronic device according to claim 1, wherein a first distance between the fulcrum and the first end is smaller than a second distance between the fulcrum and the second end.

5. The electronic device according to claim 1, wherein the cam comprises a rotating axis and an abutting surface surrounding the rotating axis; during the cam rotating along with the second body, the abutting surface abuts against the first end through a plurality of abutting points in sequence; and a plurality of third distances between the abutting points and the rotating axis increase gradually or decrease gradually during the cam rotating along with the second body.

6. The electronic device according to claim 5, wherein the abutting surface comprises an arc section; and a plurality of fourth distances between the abutting points, which are located on the arc section, and the rotating axis are equal.

7. The electronic device according to claim 5, wherein the first body comprises a base and a casing disposed on the base; the cam, the first end and the fulcrum are disposed between the casing and the base; the cover plate and the casing are arranged side by side; and the second end is located outside the casing.

8. The electronic device according to claim 1, wherein the cam comprises a rotating axis and an abutting surface surrounding the rotating axis; during the cam rotating along with the second body, the abutting surface abuts against the first end through a plurality of abutting points in sequence; and a plurality of fifth distances between the abutting points and the rotating axis are equal during the cam rotating along with the second body.

9. The electronic device according to claim 8, wherein the cam comprises a protrusion protruding from the abutting surface, and a sixth distance between the protrusion and the rotating axis is greater than the plurality of fifth distances between the abutting points and the rotating axis.

10. The electronic device according to claim 1, wherein the shaft, the cam, the lever element, and the fulcrum are disposed into a group, and the number of the group is two; a first group of the shaft, the cam, the lever element, and the fulcrum is disposed at a first side of the cover plate; a second group of the shaft, the cam, the lever element, and the fulcrum s disposed at a second side of the cover plate which is opposite to the first side of the cover plate.

\* \* \* \* \*